Dec. 14, 1954   R. F. MISHLER ET AL   2,696,884
ROTARY KNIFE STOCK CUTTER
Filed Jan. 8, 1949   6 Sheets-Sheet 1

INVENTORS
ROBERT F. MISHLER
ROBERT P. GUILEY
LESTER ROBERTS
BY Evans & McCoy
ATTORNEYS Dec. 14, 1954

R. F. MISHLER ET AL 2,696,884

ROTARY KNIFE STOCK CUTTER

Filed Jan. 8, 1949

INVENTORS
ROBERT F. MISHLER
ROBERT P. GUILEY
LESTER ROBERTS
BY *Evans + McCoy*
ATTORNEYS United States Patent Office 2,696,884
Patented Dec. 14, 1954

2,696,884

ROTARY KNIFE STOCK CUTTER

Robert F. Mishler, Robert P. Guiley, and Lester Roberts, Akron, Ohio, assignors to The General Tire and Rubber Company, Akron, Ohio, a corporation of Ohio Application January 8, 1949, Serial No. 69,862

5 Claims. (Cl. 164—76)

This invention relates to stock cutting devices, more particularly to automatic cutters of the traveling carriage type for severing continuous strip stock into pieces usually of predetermined length.

It is customary in the manufacture of many items, particularly when using rubber and similar plastics, to calender, extrude, or otherwise form the raw or partially cured material into a continuous ribbon of desired cross sectional shape or contour. This ribbon or strip stock is then transversely severed or cut at spaced points along its length for the purpose of dividing it for use into pieces or units. Usually the process is a continuous one in which pieces of the desired length are cut one at a time from the leading end of a continuously advancing strip column or ribbon of stock of uniform section.

As a convenient arrangement frequently employed, the continuously advancing strip stock is supported on the upper run of an endless conveyor belt. A carriage carrying a cutter is synchronized with the belt and arranged to sever the stock strip while the latter is supported on the belt and while the carriage is advancing at the same rate as the belt. Between severing operations the cutter is retracted to starting position. Thus the carriage reciprocates over a path paralleling the direction of movement of the conveyor belt and the stock strip carried by the latter.

The processing of relatively heavy or bulky strip stock in the manner described presents numerous problems. The heavier stocks require more power, not only for operating the conveyor, but also for actuating the cutter. The additional bulk of the stock in heavy strip material requires a relatively longer period of time for the cutting operation than does light stock. Thus conventional equipment used for light weight stock is not entirely satisfactory for the heavier stocks now required, for example, in the manufacture of large vehicle tires.

One of the principal objects of the invention is, therefore, to provide a generaly improved apparatus for cutting continuous strip stock, for handling a relatively rapidly advancing strip of relatively large weight and size, and for efficiently and accurately severing such a strip into pieces which may be of uniform size if desired. As a less generalized aspect of the invention it is sought to provide a reciprocating carriage type cutter of the character mentioned which is simple in design and of relatively light construction so that it can be economically manufactured and operated and so that it can be accommodated in a relatively small area without objectionable or extensive modifications to the building or factory in which it is used.

As a preferential arrangement, the invention contemplates, in a device of the character mentioned, a carriage arranged to travel with the stock strip during each cutting operation, in combination with a driven rotary cutter mounted on the carriage to travel back and forth across the path of the continuously advancing stock strip. An advantageous feature provided by the present invention is the raising of the strip stock off the conveyor belt in the zone of the cutting operation so that the cutting takes place without objectionable compression or distortion of the stock. As another feature, the invention provides a power driven rotary cutter which permits the cutter carriage and related parts to be of relatively light weight construction by reason of the minimized reaction imposed thereon during the cutting operation.

Another object is to provide, in a cutter of the character mentioned, a primary carriage reciprocable over a path paralleling the stock supporting conveyor in combination with a secondary carriage mounted on the primary carriage and reciprocable transversely to the path of the primary carriage. As a preferential arrangement of such a structure a driven rotary cutter is mounted on the secondary carriage and means is provided for shifting the cutter, desirably over an arcuate path, toward and away from the stock strip so that during one or the forward direction of movement of the secondary carriage the cutter performs a severing operation and during the other or succeeding movement of the carriage the cutter is retracted to starting position over a path that clears the strip stock.

Another object is to provide a power driven automatic stock cutter of the reciprocating carriage type which is arranged to perform a predetermined sequence of operations in a cutting cycle and which incorporates safety features and controls that prevent movement or operation of the parts other than in accordance with the predetermined cycle.

Other objects and advantages relating to details of construction and arrangements of parts are set forth in the following detailed description of a suitable embodiment of the invention. Structural features of the present apparatus include improved means for clamping a reciprocable carriage to a traveling belt conveyor for movement in unison; improved means for guiding a carriage to travel a straight line path while maintaining a synchronous speed relation to a conveyor advancing stock; and improved means for supporting a driven cutter on a carriage for adjustment to different angular positions so that oblique or skived cuts of different angularities can be made. The present description is made in connection with the accompanying drawings wherein like parts throughout the several views are indicated by the same letters and numerals of reference.

The apparatus of the present invention is particularly suited for use in cutting stock strips of raw or partially cured rubber compound such as that used to form the tread and shoulders of pneumatic vehicle tires although, of course, other uses of the apparatus are contemplated with or without mechanical modifications of the apparatus disclosed. In using the apparatus for cutting tread stock, such stock indicated at A, is advanced from a suitable forming means not shown over a conveyor system which includes cooling means and an endless belt forwarding conveyor indicated at F.

An endless belt 1 receives the stock A from the forwarding conveyor and supports the stock as it travels through the cutter. The severed stock strips are discharged one at a time from the conveyor belt 1 onto a conveyor D over which they are advanced at an accelerated rate to space them apart and from which they are withdrawn for further processing and use in accordance with conventional practice. The conveyor belt 1 of the cutter is trained about spaced rotatable elements 2 and 3 mounted on shafts 4 journaled on a support structure S. This supporting structure resembles a table having at each side end uprights or legs 5 and 6 and intermediate uprights arranged in pairs indicated at 7 and 8. Along the sides of the machine are longitudinally extending frame members 9 connected to the top ends of the uprights. Cross frame members 10, 11 and 12 tie the two sides of the supporting structure together. The conveyor belt 1 is driven in synchronism with the preceding conveyors of the system and at the same rate as the advancing strip stock so that any tendency of the stock A to slip on the belt 1 is minimized. The drive is by suitable means connected as by a chain 14 to a sprocket secured on the shaft which carries the rotatable cylinder or member 3 of the conveyor. The journals for the shaft carrying the rotatable member 2 of the conveyor are adjustable as by nuts 15 to shift the rotatable member 2 toward and away from the rotatable member 3 in adjusting the tension of the conveyor belt.

Along the opposite sides of the supporting structure and against the inside faces of the longitudinal frame members 9 are disposed horizontal supplemental frame members 16 which carry steel tracks 17 for main wheels 18 of primary carriage P.

Elongated truck members 19 ride on the wheels 18 and cooperatively support a tiltable platform extending transversely across the supporting structure above the level of the conveyor belt 1. The truck members 19 are each formed, intermediate their end recesses which receive the wheels 18, with a longitudinal recess or slot 20 which guidingly receives an upright plate 21 that is located and retained in the slot by a pivot pin 22 extending through aligned openings in the plate and the truck 19. The tiltable platform comprises channel section members 23 disposed in spaced parallel relation with their open channels confronting one another. These channel members are connected by end cross members 25 and intermediate cross members 26. Plates 27 are secured as by welding to the top edges of the pivoted uprights 21 and to the undersides of the platform channels 23. By this arrangement the platform, while being held against endwise movement on the trucks 19, is tiltable on the pins 22 about a horizontal axis.

Tilting of the platform is controlled by cam tracks 30 one at each side of the machine. These tracks, having horizontal and inclined portions as will later appear, are supported on horizontal plates or table members 31 secured along the tops of the side frame members 9. The outer uprights of the intermediate upright pairs 7 and 8 engage against the undersides of the corresponding table portions 31 to support the latter. Follower wheels 33 ride along the cam tracks 30 for tilting the platform P. These wheels, axially aligned, are journaled in brackets 34 secured to the underside of one of the platform channels 23, the axis of the wheels being remote from and parallel to the axis of the aligned tilt pins 22.

The truck members 19 are tied together by channel shaped cross members 35 and 36 which are parallel to one another and which have upwardly offset end portions 37 welded or otherwise secured in relieved portions extending across the undersides of the truck members. The cross tie members 35 and 36 pass beneath the upper run of the conveyor belt 1 and are preferably faced with strips 38 of metal such as stainless steel or brass which reduces friction and sticking of the belt to the cross members during periods of shut down.

Each of the trucks 19 has an inwardly offset frame portion 40 which extends downwardly in the clearance space provided between the edge of the conveyor belt 1 and each of the carriage tracks 37. These depending truck portions, the bottom ends of which are tied together by a cross bar or member 41, carry the mechanism for clamping the primary carriage to the conveyor belt 1. Eccentrics 42 are keyed on short shafts 43 journaled in brackets 44 formed on the depending truck portions 40. The depending portions of the trucks are formed with recesses 45 to receive the eccentrics.

Figures 4, 5, 6:
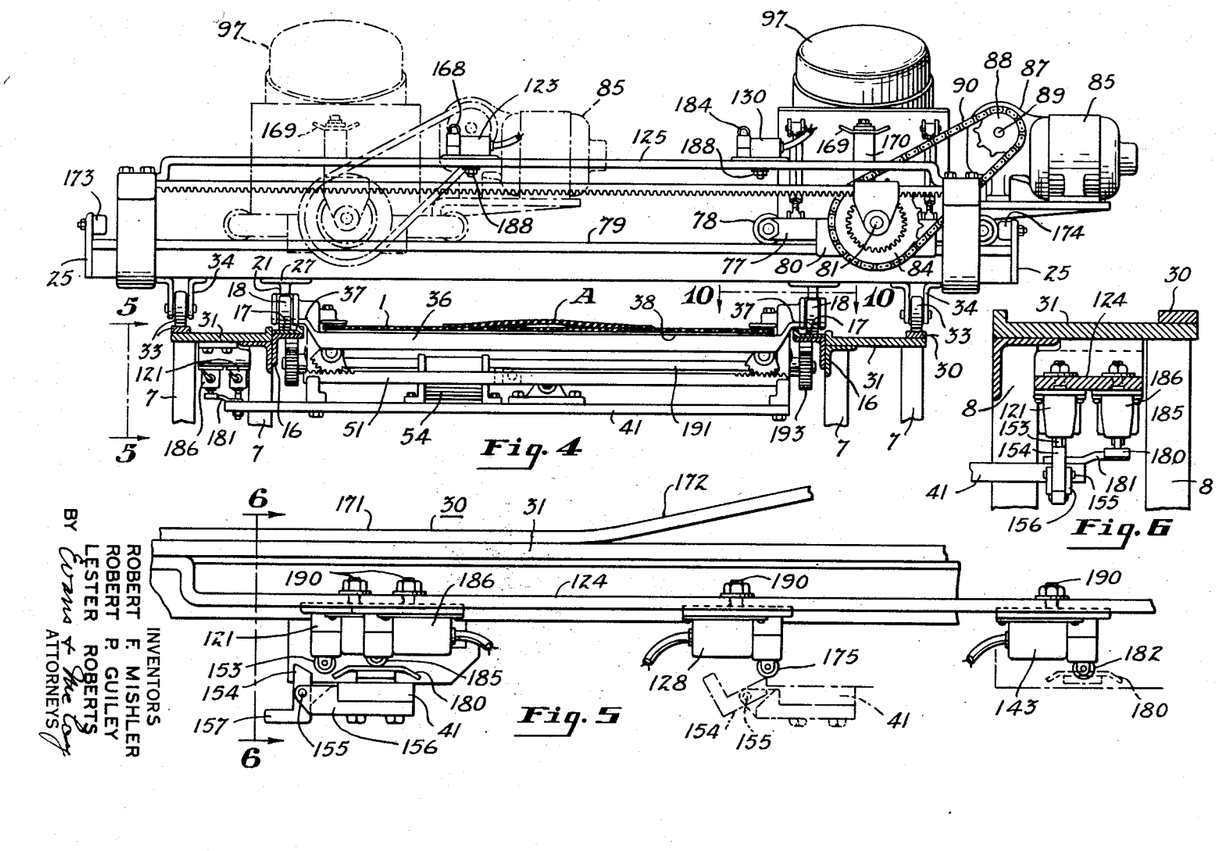
Fig. 4 is a transverse sectional view with parts broken away and removed taken substantially along the line indicated at 4—4 of Fig. 1 and enlarged with respect to that figure.
Fig. 5 is an enlarged fragmentary elevational view partly diagrammatic showing control switches governing carriage movement and operating means therefor, this view being taken substantially along the line indicated at 5—5 of Fig. 4.
Fig. 6 is a sectional detail with parts removed or broken away taken substantialy along the line indicated at 6—6 of Fig. 5.
Figures 7, 8:
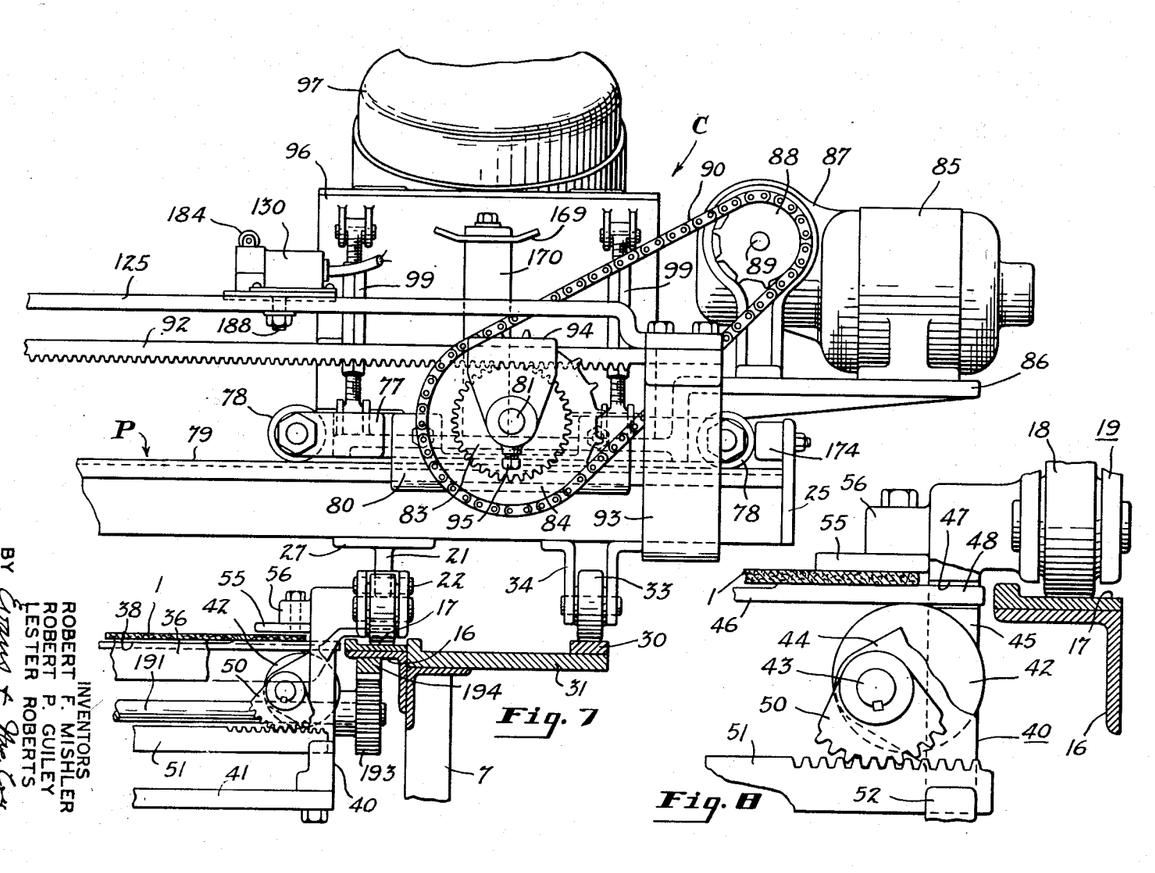
Fig. 7 is an enlarged elevational view partly in section and with parts broken away and removed, showing the manner in which the primary carriage is mounted on the supporting structure and the manner in which the secondary carriage is mounted on the primary carriage.
Fig. 8 is an enlarged fragmentary detail, partly in section and with parts broken away and removed, of one end of the traveling conveyor, showing the edge of the conveyor belt clamped in the clamping mechanism.

Supported on shoulders provided by through slots 47 in the truck portions 40 at the upper ends of the recesses 45 is a clamping bar 46. This bar is above the eccentrics and extends underneath the entire width of the conveyor belt 1, being centrally relieved as shown. Reduced ends 48 of the bar provide shoulders 49 which are engageable with the inside faces of the truck depending portions 40 adjacent the slots 47 to limit endwise travel of the clamping bar. On one end of each of the short shafts 43 is keyed a gear segment 50. The teeth of these segments mesh with the teeth of a rack bar 51 supported for longitudinal sliding movement in stirrups 52 formed on the truck depending portions 40. The piston rod of an air cylinder assembly 54, Fig. 4, is connected to the rack bar 51 so that upon the introduction of air or other pneumatic fluid under pressure into one or the piston end of the cylinder assembly the rack bar is shifted forward or to the right as viewed in Figs. 4, 7 and 8. The bar is retracted or shifted in a reverse direction to the left upon the introduction of high pressure pneumatic fluid into the other or closed end of the cylinder assembly, air exhausting from the first mentioned end. When the rack bar 51 is thus shifted to the right from the retracted position shown in Fig. 8 the short shaft 43 and the eccentric 42 are turned in a counterclockwise direction, lifting the clamping bar 46 off the shoulders in the slots 47 and against the underside of the conveyor belt and forcing the belt against the flat gripping faces formed on the undersides of plates 55 bolted to extensions 56 on the inside faces of the trucks 19.

While forward motion of the primary carriage is effected by clamping it to the upper run of the endless belt in the manner described, return movement of the carriage to starting position is effected by weights 58 which travel vertically in the channels of the frame uprights 5. The weights are suspended on chains 59 connected to the trucks 19 at 60 and trained over fixed support sprockets 61 and the under fixed guide sprockets 63. The support sprockets are mounted above the level of the conveyor belt on the upper ends of frame structure uprights 62 while the guide sprockets are rotatable on stub shafts carried by gusset plates 64 of the frame structure. A cover 65 may be attached to the frame uprights 5 to provide an enclosed guideway for the weights 58.

An orienting device is incorporated in the present apparatus for the purpose of guiding the primary carriage along the tracks 17. This device comprises a cross shaft 191 journaled adjacent its ends in brackets 192 bolted to the depending frame portions 40 of the carriage trucks. On the projecting ends of the shaft 191 are secured gears 193, one at each end of the carriage, which mesh with racks 194 fastened as by screws to the undersides of the supplemental frame members 16. As the primary carriage travels back and forth on the tracks 17 the intermeshing relation of the gears and the racks, the gears being constrained by the shaft 191 to rotate in unison, constrains the two trucks of the carriage to movement in unison and at the same rate. In this manner the primary carriage is retained in desired angular relation to the path of the conveyor belt 1 and advancing stock carried by the conveyor. Although the primary carriage is disposed, in the present apparatus, so that the secondary carriage mounting the driven cutter travels over a path approximately 90° to the path of the advancing stock on the conveyor belt, it is apparent that other angularities may be employed as when it is desired, for example, to cut the traveling stock on the bias.

Return movement of the carriage after a forward run is cushioned by an air cylinder assembly arranged as a dashpot. This cylinder, indicated at 66, is supported at its base end on a frame cross member 67. The other end of the cylinder extends over the cross member 11. A piston 68 is slidable back and forth in the cylinder and is connected by a rod 69 to the carriage cross bar 41. On the forward run of the carriage the piston 68 moves to the right as viewed in Fig. 2, drawing air into the cylinder through a check valve 70 and, after passing a cylinder vent hole or port 71, through the latter. Thus the cylinder and piston assembly offer minimum resistance to forward carriage travel. Upon release of the carriage after a cutting operation, as will be later described, the weights 58, previously raised by the forward movement of the carriage, act through the chains 59 to draw the carriage assembly to the left over the tracks 17. During this return movement the piston 68 moves into the cylinder, forcing the air in the latter to exhaust through the vent opening 71 until the piston passes such opening. Upon movement of the piston 68 to the left beyond the vent or port 71, the air in the left or base end of the cylinder is compressed, retarding the carriage. The check valve 70 is closed as by gravity or a coil spring 72 during the return run of the carriage. An adjustable escape valve 73 is connected into the base end of the cylinder and allows a limited escape of the compressed air so that after initial cushioning occurs, the carriage slowly moves against stops 74 having rubber facings 75. These stops are bolted to the tracks 17 and may be shifted to different positions along the tracks to adjust the starting position of the carriage.

The primary carriage P comprising the tiltable platform, the supporting trucks, and the belt clamping mechanism associated therewith, carries a secondary or cutter mounting carriage C which rides back and forth across the tiltable platform transversely to the path of the strip stock A. The secondary carriage comprises a truck member 77 that is supported by wheels 78 that travel on parallel rails 79 attached along the top flanges of the platform channels 23. The carriage truck is held on the platform and the wheels are guided along the tracks by gib members 80 bolted to the truck sides. These gibs embrace the sides of the tracks 79 and extend under laterally projecting portions of the tracks to retain the wheels of the carriage snugly against the tracks during back and forth movement of the carriage and during tilting of the platform to be later described. A stub shaft 81 is supported in a bracket 82 formed on and projecting from one side of the secondary carriage truck. This shaft rotatably mounts a combined gear 83 and sprocket 84 secured together for rotation in unison. A reversible electric motor 85 of the gearhead type is mounted on a cantilever extension 86 of the carriage frame and drives through gearing contained in an end bell housing 87. The gearing in this housing drives a shaft 89 carrying a sprocket 88. An endless chain belt 90 is trained about the sprockets 83 and 88 to drivingly connect the gear head motor 85 to the shaft 81 of the secondary carriage.

A rack bar 92 is supported at its ends by brackets 93 attached to the underside of the channel members 23 of the tiltable platform, the rack bar paralleling the carriage tracks 79 and being disposed so that its teeth mesh with the teeth of the driven gear 83. A retainer guide 94 is rigidly mounted on the projecting end of the carriage shaft 81 and extends upwardly and in overlying relation to the top of the rack bar 92 for the purpose of holding the teeth of the rack and gear in meshing relation. This guide is secured on the shaft 81 by a set screw 95. Rotation of the gear 83 in one direction, or clockwise as viewed in Figs. 4 and 7, traverses the secondary carriage C in a stock cutting movement across the primary carriage in a forward direction or to the left as viewed in such figures. Reverse rotation of the motor 85 turns the gear 83 in a counterclockwise direction, traversing the secondary carriage to the right as viewed in the figures referred to so as to return the secondary carriage to starting position after the cutting operation.

Mounted on the secondary carriage C is an adjustable bracket 96 which supports a cutter drive motor 97. The bracket 96 is tiltable as by being pivoted on a hinge pin 98 secured to the secondary carriage 77, the tilt axis being parallel to the direction of travel of the secondary carriage. Adjustable length links 99, extending between the secondary carriage and the bracket 96, retain the latter in any desired position of angular adjustment. The motor 97 is thus supported with its rotational axis oblique or at an acute angle to the plane of the stock supporting conveyor belt 1. This electric motor turns at a speed of about 1200 R. P. M., although of course other speeds may be used, and has a downwardly angled or directed shaft 101 on the end of which is secured a circular disc cutter 100. The plane of this cutter is oblique to the conveyor belt, preferably being at an angle of from about 30° to about 45° to form skived or beveled edges on the strip stock being cut. Traversing movement of the secondary carriage carries the disc cutter 100 and the drive motor therefor back and forth across the primary carriage, the trucks 19 being relieved or cut away to provide recesses 102 through which the disc cutter passes at the ends of its traversing movements.

Figures 9, 10:
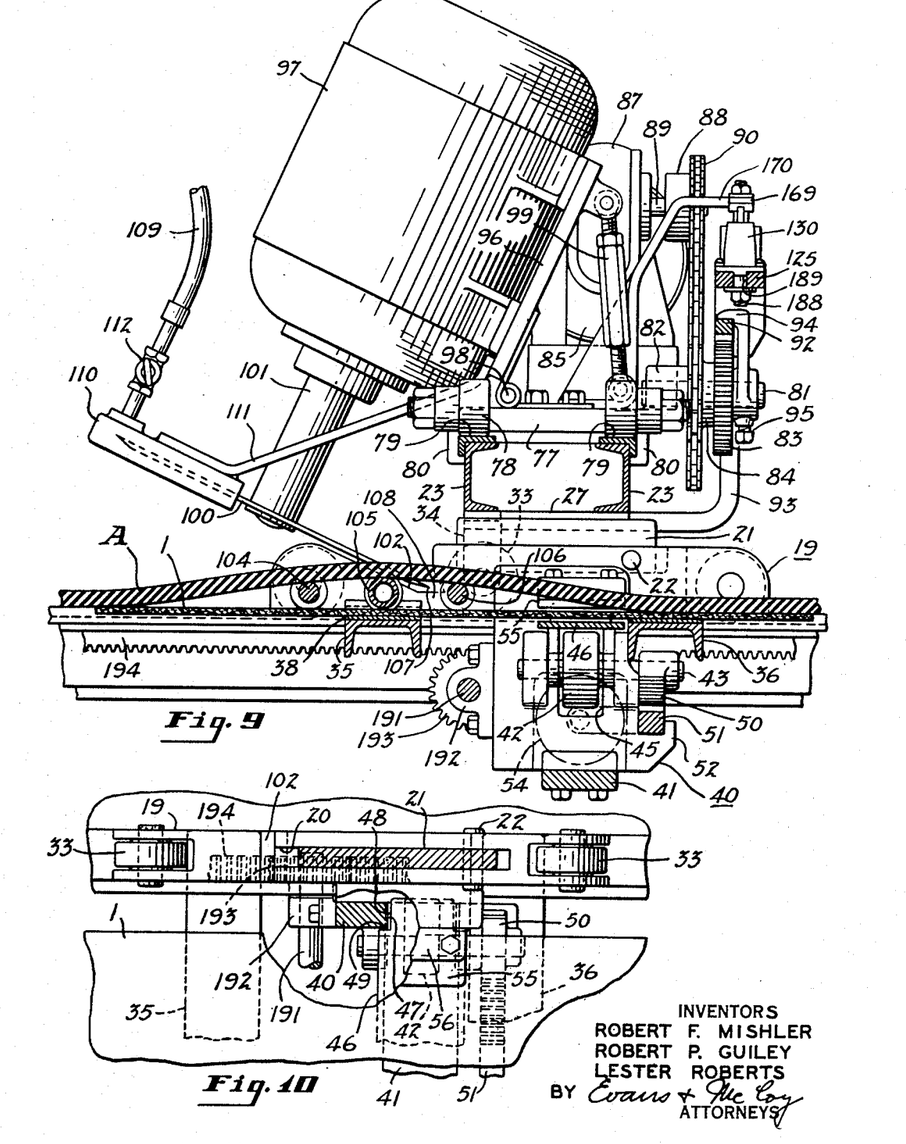
Fig. 9 is a longitudinal sectional detail, with parts broken away and removed, taken longitudinally through the conveyor belt and the stock strip carried thereby, this view showing the carriages at the same scale as Fig. 7.
Fig. 10 is a fragmentary plan view partly in section and with parts broken away and removed showing one end of the primary carriage.

A portion of the strip stock A, located beneath the tiltable platform of the carriage P, is supported on rotatable cross members or rollers 104, 105 and 106 which are journaled at their ends in sockets provided therefor in the trucks 19 of the primary carriage. These rollers are parallel to one another and extend transversely of the conveyor belt 1 closely adjacent the top run or stock supporting surface of the latter. As shown in Fig. 9, the rollers elevate a portion of the strip stock A in a bridge or arch in the path of the traveling disc cutter 100. Thus the severing operation is performed while the stock is in a curved or bent condition and while suspended above the supporting conveyor belt so that edge 107 of the disc cutter 100 passes downwardly through and beyond the strip stock and extends into clearance space 108 between the strip stock and the supporting surface of the conveyor belt. The bending or bridging of the strip stock for the cutting operation causes the severed ends of the stock to separate or draw away from one another, thus clearing the cutting disc 100 and minimizing frictional drag on the latter. Distortion of the rubber stock is likewise avoided by this arrangement and cleaner and more uniform cuts result.

Lubricant such as water is applied to the rotative cutting disc 100 continuously during the cutting operation through a flexible conduit 109 which connects to a semicircular casing 110 enclosing the upper portion of the cutter disc 100. The casing 110 is supported by arms 111 secured to the tilt bracket 96. A manual valve 112 for adjusting the flow volume is interposed between short lengths of rigid conduit connecting the flexible conduit 109 to the cutter casing 110. In operation, however, the supply of water to the cutter is also controlled by a magnetic or solenoid valve as will be later described.

The control of the apparatus is by means of an electrical circuit employing conventional limit switches, relays, magnetic or solenoid valves and the like. A suitable electrical circuit and its components are diagrammatically shown in Fig. 11. Electrical circuit is supplied from a suitable source by conductors L–1 and L–2. Electricity for the cutter drive motor 97 is supplied from the conductors L–1 and L–2 through a manual switch 114 and a starter 115. Conductors or wires 116 and 117 to this motor are preferably carried in a flexible sheath supported as by being suspended from above.

Figure 11:
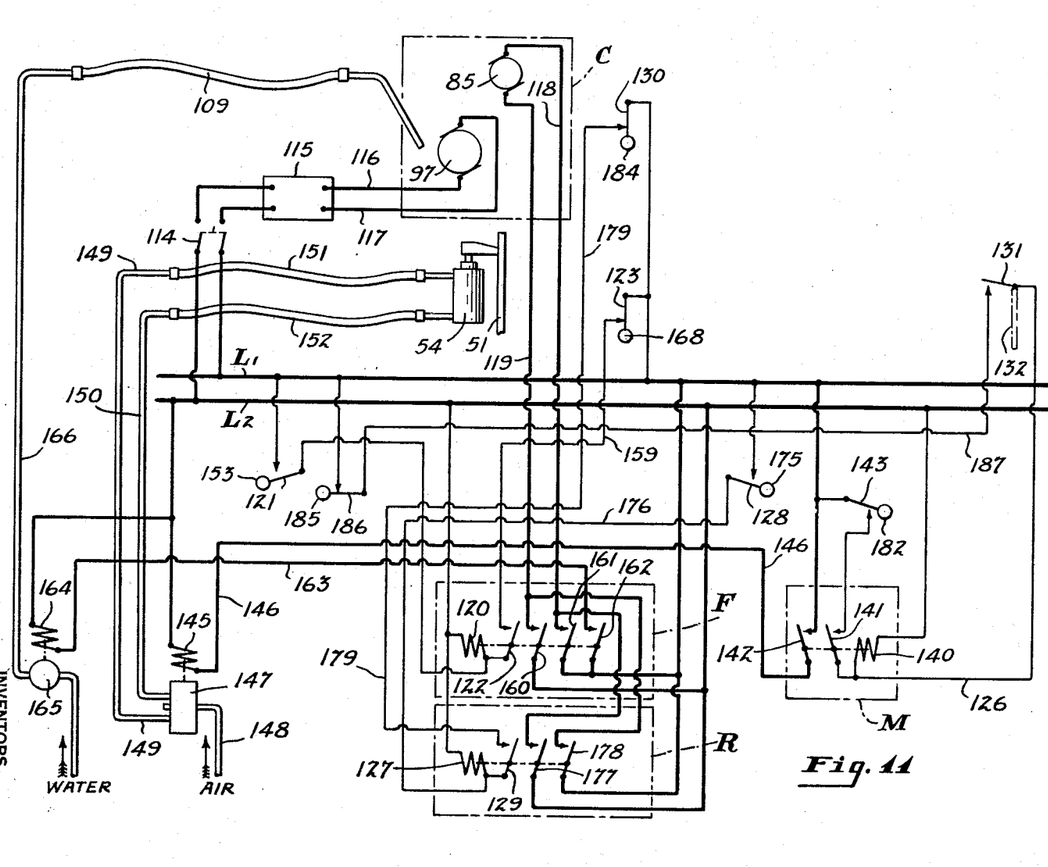
Fig. 11 is an electrical wiring diagram showing a suitable circuit combination for connecting the electrical components and for controlling the operation of the apparatus.

Electrical current for the gear head carriage drive motor 85 is supplied through conductors or wires 118 and 119, also preferably contained in a suspended flexible sheath and connected through either a forward relay F or, alternatively, through a reverse relay R to the main line conductors L–1 and L–2. The forward relay has a contact carrying armature actuated by a solenoid 120 wired or connected to the conductor L–2 and to the conductor L–1 through a normally open spring biased limit switch 121. This solenoid is wired to the supply conductor L–1 also through a holding contact 122 of the relay in series with a normally closed spring biased limit switch 123.

The open limit switch 121 is suspended from a mounting bar 124 attached to the underside of one of the table plates 31 and extending longitudinally of the supporting structure S. The closed limit switch 123 is mounted on the primary carriage P on the top of a supporting bar 125 attached at its ends to the brackets 93 which carry the rack 92 employed in the drive for the traveling or secondary cutter carriage. The switch mounting bar 125 is above the rack bar and parallels the latter.

The reverse relay R has an armature actuated by a solenoid coil 127 wired or connected to the supply conductor L–2 and through a normally open spring biased limit switch 128 to the supply conductor L–1. This limit switch is also suspended from the mounting member 124, being spaced from the limit switch 121 in the direction of the primary carriage movement or to the right as viewed in Figs. 1 and 5. The reverse relay solenoid is also connected to the supply conductor L–1 through a holding contact 129 on the relay armature in series with a normally closed spring biased limit switch 130 mounted on the bar 125 of the primary carriage.

A master or cycle control relay M governs the initiation of each cutting cycle and is responsive to a normally open spring biased switch 131 actuated by a pendant or finger 132 that is engaged by a leading end of the strip stock A as such stock advances on the receiving end of the discharge conveyor D. The pendant is secured to and suspended from a cross rod 133 journaled at its ends in uprights 134 carried by side members 135 of the discharge conveyor D. The upper ends of the uprights 134 may be connected together as by a cross member 136. Attaching bolts 137 for the uprights extend through elongated slots 138 in the conveyor frame members D so that the starting switch and pendant assembly can be shifted bodily along the discharge conveyor in adjusting the apparatus to vary the length of stock strips severed.

Closing of the starting switch 131 by movement of the leading end of the stock strip A against the pendant 132 energizes armature solenoid 140 of the master relay M closing contacts 141 and 142. The solenoid is wired or connected directly to conductor L–2 and by wires 126 and 187 to the supply conductor L–1 in series with the switch 131 and a limit switch 186 to be later described.

The contact 141 is connected in series with a normally closed spring biased limit switch 143 to conductor L–1 to maintain or hold energization of the armature solenoid 140 independently of the starting switch 131. The closing of relay contact 142 connects the supply conductor L–1 by electrical conductor or wire 146 to magnetic or solenoid coil 145 of a conventional three-way electrically operated pneumatic valve 147. This valve receives air under pressure from a suitable source, not shown, through a conductor 148. The armature of this magnetic valve is spring biased normally to connect the high pressure air supply to a conductor 149 connected to the piston rod or right-hand end as viewed in Fig. 4 of the air cylinder assembly 54. The air under pressure thus normally holds the piston rod retracted into the cylinder and retains the rack bar 51 in its limiting position to the left as viewed in Figs. 4 and 7. In such retracted position the gear segments 50 hold the eccentrics 42 in lowered positions or in their clockwise limiting positions as viewed in the same figures.

Energization of the valve solenoid 145 through the master relay in the manner described shifts the armature of the three-way valve 147 to connect the high pressure air conduit 148 to the other or closed end of the air cylinder 54 through a conduit 150. The high pressure air thus admitted to the closed end of the piston-cylinder assembly forces the piston rod out of the cylinder or to the right as viewed in Fig. 4 and shifts the rack bar 51 to advance to clamping position. The rack bar, acting through the gear segments 50, raises the eccentrics 42 against the underside of the clamping bar 46 to force the latter upwardly against the conveyor belt 1 and to grip the conveyor belt between the clamping bar and the plates 55 of the primary carriage trucks (see Fig. 8 which shows the parts at one end of the traveling conveyor in clamping positions). The air conductors 149 and 150 include flexible portions 151 and 152 respectively, to provide for relative movement of the primary carriage on the supporting structure, the three-way air valve 147 being mounted on the latter. In the actuation of the air cylinder assembly 154 by the introduction of high pressure air into one end through the conductor 149, air is exhausted from the other end through the conductor 150 and vice-versa.

Figures 1, 2:
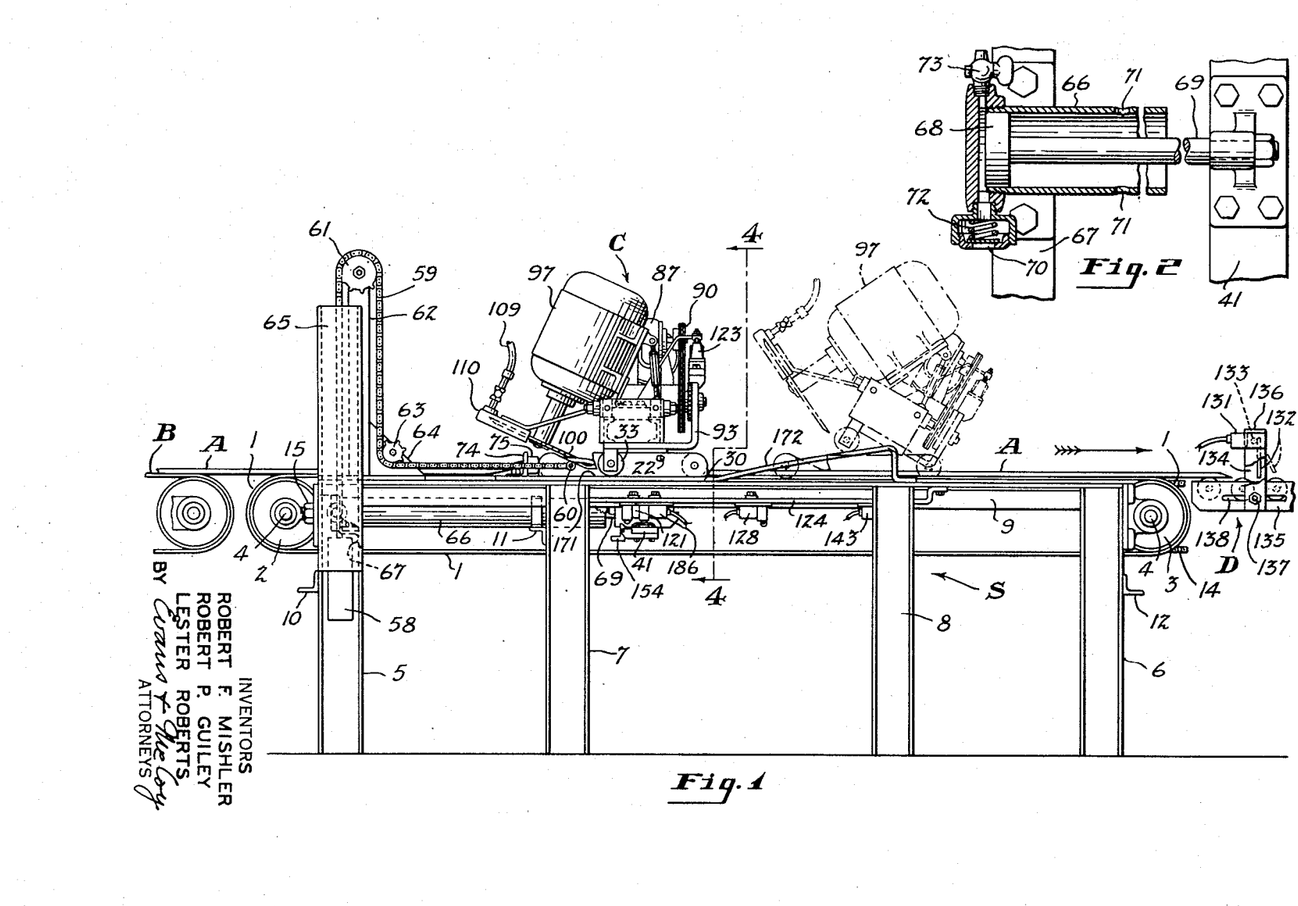
Figure 1 is a side elevational view, with parts removed, of apparatus for severing continuously advancing strip stock into pieces of uniform length, broken lines showing the carriage in advanced position and fragmentary portions of conventional feeding and discharge conveyors being shown aligned with the belt conveyor of the cutting apparatus.
Fig. 2 is a sectional and foreshortened detail taken longitudinally through the air cylinder and piston device for cushioning the return movement of the carriage, this view being enlarged with respect to Figs. 1 and 3.

The clamping of the primary carriage P to the conveyor belt 1 at the starting position shown in Fig. 1, moves the carriages to the right as viewed in that figure in unison with the conveyor and the strip stock A. Shortly after such carriage movement is initiated, the normally open limit switch 121 is closed by engagement of actuating roller 153 of such switch by the inclined face of an upstanding pivoted pawl 154. This pawl is carried by a pin 155 supported across the bifurcated end of a bracket 156 (Figs. 5 and 6) bolted against the underside of a projecting end portion of the carriage bottom cross member 41. The bottom of the pawl 154 is formed with a lateral or cantilever extension 157 which serves as a weight to hold the pawl against the bottom of the recessed end of the bracket 156, such recess bottom serving as a stop preventing turning of the pawl on the pivot 155 in a counterclockwise direction as viewed in Fig. 5 beyond the position shown in the full lines of that figure. Thus on forward travel of the carriages the spring pressed roller 153 of the limit switch 121 rides up the inclined face of the pawl 154 to close the switch, the pawl being restrained by the bracket stop against turning on the pivot 155.

Closing of the switch 121 in the manner just described connects one terminal of the solenoid coil 120 of the forward relay F to the supply conductor L–1, the other terminal of the coil being wired or connected to the supply conductor L–2. Resulting energization of the relay coil actuates the armature of the relay to close all four of the relay contactors. The holding contactor 122 connects the coil 120 to the supply conductor L–1 through the normally closed limit switch 123 previously mentioned and a wire or conductor 159. Thus energization of the relay solenoid 120 is maintained after movement of the pawl 154 beyond the roller 153 of the spring actuated limit switch 121 and the resulting opening of such switch.

Figure 3:
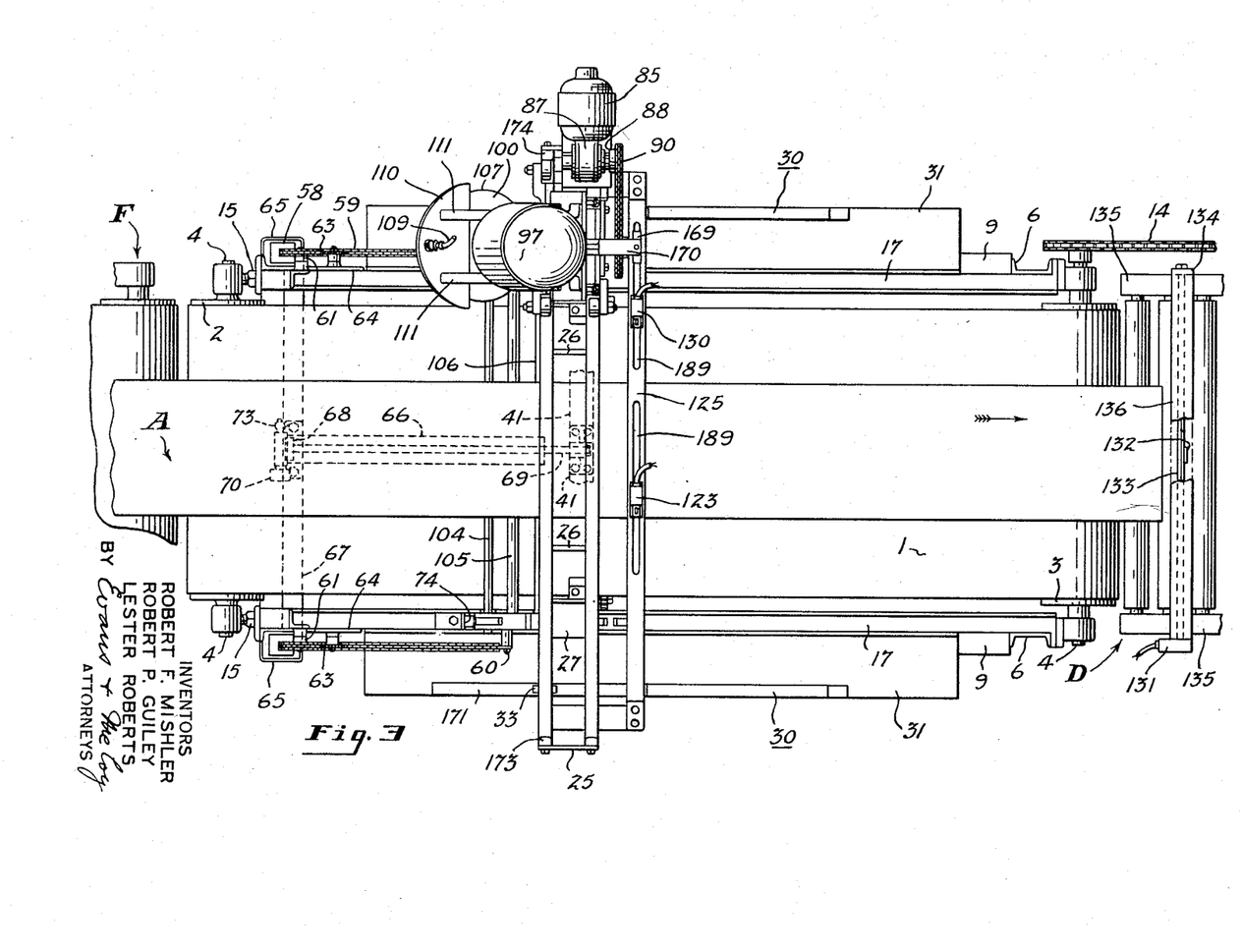
Fig. 3 is a plan view, with parts broken away and removed, showing the cutting apparatus and conveyors of Fig. 1.

The closing of the forward relay F connects the gear head carriage motor 85 to the supply conductors L–2 and L–1 through the wires 117 and 118, previously mentioned, and relay contactors 160 and 161, respectively. Thus energized, the motor 85 turns the gear 83 clockwise (Figs. 4 and 7) to drive the secondary carriage C from its starting position, indicated by the solid lines of Figs. 1, 3 and 4, forwardly across the tiltable platform of the primary carriage P.

This forward movement of the secondary carriage forces the rotating cutter disc 100 through the arched strip stock A, it being understood that by reason of the clamping of the belt 1 between the bar 46 and the plates 55 the primary carriage is moving synchronously and in unison with the traveling strip stock A so that the cutter disc is also moving in unison with the strip stock and makes a transverse cut substantially normal to the path of the stock. A fourth contactor 162 of the relay F connects the supply conductor L–1 through a conductor 163 to one terminal of solenoid coil 164 of a spring biased magnetic fluid valve 165. This valve is interposed in a pipe or conduit 166 which carries water under pressure from a suitable source to the flexible conduit 109 leading to the casing 110 surrounding the upper portion of the cutter disc 100. Thus the supply of lubricating water to the cutter disc is commenced simultaneously with the energization of the carriage for movement in a forward or stock cutting direction.

As the disc cutter 100 completes the severing operation, spring pressed roller 168 of the limit switch 123 is engaged by a shoe 169 carried on a horizontally disposed upper end portion of a bracket 170 extending upwardly from the truck 77 of the secondary carriage. This actuation of the limit switch 123 opens the circuit through the conductor 159, de-energizing the solenoid coil 120 of the forward relay F to release the armature of the relay and open the contactors 122, 160, 161 and 162. The gear head carriage motor 85 is thus disconnected from the electric power source and acts as a brake on the secondary carriage which continues to coast or move to the left as viewed in Fig. 4. The opening of the relay contactor 162 de-energizes the circuit through the solenoid coil 164 of the magnetic valve 165 permitting the spring of such valve to close the same and shut off the water supply to the cutter disc 100.

During that portion of the forward travel of the secondary carriage C in which the severing of the strip stock A takes place, the tilt rollers 33 of the primary carriage travel along flat or horizontal portions 171 of the cam tracks 30. After the cutter disc 100 clears the edge of the strip stock A, the tilt rollers 33 start up inclined portions 172 of the cam tracks so as to tilt the platform of the primary carriage P about the pivot pins 22 substantially to the position indicated by the broken lines of Fig. 1. This tilting of the primary carriage effects a swinging or tilting of the secondary carriage, still coasting or moving in a forward direction across the primary carriage, so as to elevate the cutter disc 100 entirely above the stock strip A.

Rubber bumpers 173 and 174 are supported on upwardly projecting portions of the end plates or cross members 25 of the primary carriage and are engageable with the carriage wheels 78 to limit, respectively, the forward and return movements of the secondary carriage on the tracks 79 of the primary carriage. In operation, however, the machine is adjusted so that while the secondary carriage C is coasting beyond the motor de-energizing limit switch 123, and before its wheels strike the end stop or bumper 173 at the left end (Fig. 4) of the tilt or primary carriage P, the inclined face of the pawl 154 engages spring pressed roller 175 of the limit switch 128 to energize armature coil 127 and actuate the reverse relay R. The actuated limit switch 128 connects the supply conductor L-1 to one terminal of the solenoid coil 127 of the reverse relay through a conductor or wire 176, the other terminal of the coil being connected to the supply conductor L-2. The coil 127, thus energized, actuates the relay armature to close the holding contactor 129 and relay contactors 177 and 178.

The contactor 129 maintains energization of the relay coil 127 through the normally closed limit switch 130 carried on the bar 125 of the primary carriage and a wire or conductor 179. The contactors 177 and 178 connect the reversible gear head motor 85 to the conductors L-2 and L-1 respectively, to energize the motor for reverse rotation. This reverse rotation of the carriage drive motor applies a strong braking force to the forward movement of the secondary carriage which normally will prevent the wheels of the carriage from striking the forward limit bumper 173 and then actuates the gear 83 for rotation counterclockwise as viewed in Fig. 4 to return the secondary carriage to initial or starting position, such movement being to the right as viewed in such figure.

Subsequent to the starting of the return movement of the secondary carriage, the primary carriage reaches its limit of forward movement such as indicated by the broken lines of Fig. 1. A shoe 180 supported on an arm 181 extending from the end of the primary carriage cross member 41, engages spring pressed roller 182 of the normally closed limit switch 143. Thus actuated, the limit switch opens the circuit through the holding or solenoid coil 140 of the master relay. The spring biased armature of the relay then opens the contactors 141 and 143, the latter de-energizing the solenoid coil 145 of the magnetic three-way valve 147. The spring pressed valve body of the de-energized magnetic valve then shifts to admit high pressure air into the piston rod end of the cylinder assembly 54 which retracts the piston rod thereof and shifts the rack bar 51 to the left (Fig. 4) releasing the grip of the bar 46 and the plates 55 on the conveyor belt 1. The carriages, thus released from the conveyor belt, stop and are then drawn back to starting position against the limit stops 75 by the weights 58. During this return movement of the carriages the pivoted pawl 154 rides over the rollers 175 and 153 of the limit switches 121 and 128, respectively, without actuating the latter, the pawl turning on the pivot 155 to a clearance position such as indicated by the broken lines of Fig. 5.

The returning movement of the secondary carriage across the primary carriage, which commences, by reason of the reverse energization of the gear head motor 85 in the manner described, prior to the conclusion of the travel of the forward carriage, continues during the return movement of the primary carriage. As the reversely moving secondary carriage approaches its starting position the shoe 169 rides over spring pressed roller 184 of the limit switch 130. This actuation of the normally closed limit switch opens the holding circuit through the armature coil 127 of the reverse relay R permitting the spring biased armature to open the contactors 129, 177 and 178, de-energizing the motor 85 and allowing the secondary carriage to coast to rest in starting position against the limit bumpers 174, the motor and gears braking the carriage movement and then serving to hold the carriage in starting position.

As the primary carriage is returned to starting position against the stops 174, the shoe 180 rides under spring pressed roller 185 of the normally open spring biased limit switch 186 which is connected to supply conductor L-1 and by an electrical conductor or wire 187 to the starter switch 131. Thus closed, the switch 186 sets or prepares the circuit so that subsequent closing of the switch 131 by engagement and movement of the pendant 132 by the advancing end of the stock strip A, recycles the apparatus. The severed strips of stock are advanced over the discharge conveyor D at an accelerated rate to separate the severed ends and to provide a gap or space which permits the pendant 132 to drop to normal position.

The limit switches 123 and 130 are fastened to the mounting bar 125 as by bolts 188 which are received through elongated slots 189 formed in the bar to permit the limit switches to be adjusted to various positions. By such adjustment of the limit switch 123 the position of the forwardly moving secondary carriage C at which de-energization of the gear head motor 85 takes place can be regulated in accordance with the width of the strip stock A being processed. Adjustment of the limit switch 130 varies the position of the returning secondary carriage at which reverse energization of the gear head motor is stopped and the coasting of the carriage to starting position begins.

The mounting member 124 is also formed with elongated slots through which are received attaching bolts 190 for the limit switches 121, 128, 143 and 186. Adjustment of the limit switch 121 to different positions along the mounting member varies the time interval between clamping of the primary carriage to the traveling conveyor belt 1 and the energization of the gear head motor 85 for forward travel of the carriage C across the primary carriage in a stock severing operation. This time limit interval is normally relatively short but may be increased if desired to permit normalizing of the strip stock across the arching or supporting rollers 104, 105 and 106, it being understood that during ever return movement of the primary carriage to starting position after a cutting cycle, the rollers are drawn along in a reverse direction under the advancing strip stock.

Adjustment of the limit switch 128 to different positions along the mounting member 124 varies the position of the forwardly moving secondary carriage C at which reverse energization of the gear head motor 85 occurs. The adjustment is preferably such as to provide for a period of coasting of the carriage C after the forward driving of the gear head motor is stopped by the limit switch 123, but sufficiently soon thereafter to prevent striking of the carriage rollers 78 against the rubber bumpers 173 of one of the end stops 25. Reverse movement of the carriage C is also delayed sufficiently to insure clearance of the strip stock A by the returning disc cutter 100.

The limit switch 143 is adjusted on the mounting bar or member so that the clamping bar 46 releases the conveyor belt 1 only after the platform of the primary carriage P has been tilted sufficiently to elevate the cutter disc 100 to a clearance position above the level of the strip stock A.

The limit switch 186 is placed so that it is held closed by the actuating shoe 180 when the primary carriage is in starting position with the truck wheels 18 against the stops 74. Thus the limit switch 186 and the actuating shoe 180 are combined to guard against improper cycling since they insure that the primary carriage be properly returned to a predetermined starting position before actuation of the pendant 132 can be effective to initiate a cutting cycle.

The principles of the present invention may be utilized in various ways, numerous modifications and alterations being contemplated, substitution of parts and changes in construction being resorted to as desired, it being understood that the embodiment shown in the drawings and described above and the particular method set forth are given merely for purposes of explanation and illustration without intending to limit the scope of the claims to the specific details disclosed.

What we claim and desire to secure by Letters Patent of the United States is:

1. Strip severing apparatus comprising strip supporting and advancing conveyor means, a primary carriage having a platform tiltable about an axis and means for reciprocating the carriage over a path paralleling the direction of movement of a strip advancing on the conveyor means, a secondary carriage and means mounting the same on the tiltable platform for movement transverse to said direction, a cutter on the secondary carriage, and means for shifting the tiltable platform about said axis to move the secondary carriage and the cutter carried thereby away from a strip advancing on the conveyor, and for tilting said platform about said axis to a position where said cutter engages a strip on the conveyor.

2. Strip severing apparatus comprising conveyor means for supporting and advancing strip material, a primary carriage and means mounting the same for reciprocation over a path paralleling the path of material advanced by the conveyor, a pair of spaced, generally parallel rollers on the carriage engageable with strip material on the conveyor for displacing a portion of advancing strip material vertically, a secondary carriage mounted on the primary carriage for movement transverse to the path of strip material advanced on the conveyor, and a cutter carried by the secondary carriage, said cutter being positioned for movement through a zone of the displaced portion of strip material spaced from and between the strip displacing rollers during said transverse movement of the secondary carriage.

3. Strip severing apparatus comprising strip supporting and advancing conveyor means, a primary carriage having a platform tiltable about an axis transverse to the direction of movement of a strip advancing on the conveyor means and having means for reciprocating the carriage over a path paralleling said direction of movement, a secondary carriage and means mounting the same on the tiltable platform for movement transverse to said direction, a cutter on said secondary carriage, said platform being tiltable about said axis to move the secondary carriage and the cutter carried thereby to a position where siad cutter engages a strip on the conveyor, and means for shifitng the tiltable platform automatically to move the secondary carriage and the cutter carried thereby away from a strip advancing on the conveyor.

4. Apparatus of the character described for cutting strip stock into pieces comprising a supporting structure, conveyor means carried by the supporting structure for receiving advancing strip stock, a primary carriage and means mounting the carriage on the supporting structure for reciprocable movement parallel to the path of strip stock advancing over the conveyor, a secondary carriage mounted on the primary carriage for reciprocable movement transverse to the movement of the primary carriage, a cutter on the secondary carriage and mounted for movement toward and away from the conveyor, electric motor means mounted on one of the carriages for driving the secondary carriage across the primary carriage from a starting position to advance the cutter in a severing movement through strip stock on the conveyor means and return, means comprising a cam track and follower associated with the primary carriage for controlling the position of the secondary carriage and the cutter carried thereby in response to movement of the primary carriage, said cam track having a horizontal portion with which the follower engages during said severing movement to permit dwell of the cutter in strip severing position and having an inclined portion with which the follower engages subsequent to the severing movement for shifting the secondary carriage and the cutter carried thereby away from the conveyor means whereby the cutter clears strip stock advancing on the conveyor means during return of the secondary carriage to the starting position, and means for stopping said secondary carriage at said starting position.

5. In strip severing apparatus, conveyor means for advancing strip stock to be severed, a primary carriage and means supporting the same for reciprocation over a path substantially parallel to the path of advancing strip stock on the conveyor means, means for connecting the carriage to the conveyor for movement in unison therewith, a secondary carriage and means supporting the same on the primary carriage for reciprocation over a path transverse to the path of advancing strip material, a cutter carried by the secondary carriage and mounted for movement toward and away from the conveyor, motor means for driving said secondary carriage and the cutter carried thereby in the transverse direction from a starting position, means for effecting connection of the primary carriage and conveyor means, means responsive to a predetermined movement of the primary carriage and conveyor in unison for initiating transverse driving of said secondary carriage by said motor means to cause severing movement of the cutter from said starting position through strip stock supported by the conveyor means, cam means responsive to a further predetermined movement of the primary carriage for shifting the cutter away from the conveyor means subsequent to the severing movement so that the cutter clears strip stock advancing on the conveyor means during return of the cutter to said starting position, means responsive to a predetermined movement of the primary carriage and conveyor in unison for effecting reversal of the secondary carriage by said motor means subsequent to the severing movement and during shifting of the cutter away from the conveyor means, means responsive to a further predetermined movement of the primary carriage and conveyor in unison for terminating the unison movement, and means for terminating driving of said secondary carriage by said motor means and for stopping said secondary carriage at said starting position.

References Cited in the file of this patent

UNITED STATES PATENTS

| Number | Name | Date |
|---|---|---|
| 556,857 | Madden | Mar. 24, 1896 |
| 1,538,086 | Buttress | May 19, 1925 |
| 1,567,289 | Munroe | Dec. 29, 1925 |
| 1,924,162 | Mason | Aug. 29, 1933 |
| 1,987,409 | Moore | Jan. 8, 1935 |
| 2,057,928 | Stahl | Oct. 20, 1936 |
| 2,066,566 | Janson et al. | Jan. 5, 1937 |
| 2,181,398 | Firestone | Nov. 28, 1939 |
| 2,249,395 | Reese | July 15, 1941 |
| 2,273,533 | Mather | Feb. 17, 1942 |
| 2,550,191 | Godat | Apr. 24, 1951 |

FOREIGN PATENTS

| Number | Country | Date |
|---|---|---|
| 571,381 | Germany | Feb. 28, 1933 |
| 101,950 | Australia | Sept. 16, 1937 |